United States Patent [19]

Okunishi et al.

[11] Patent Number: 4,776,081

[45] Date of Patent: Oct. 11, 1988

[54] MULTI-SPINDLE HEAD-REPLACING MACHINE TOOL

[75] Inventors: Hiromu Okunishi; Hitoshi Hashimoto, both of Iruma; Takeshi Ishibashi, Sayama; Fumio Higuchi, Kawagoe; Shinichi Kuriyama, Tokorozawa; Hiroshi Yamamoto, Hidaka, all of Japan

[73] Assignee: Honda Giken Kogyo Kabushiki Kaisha, Tokyo, Japan

[21] Appl. No.: 110,660

[22] Filed: Oct. 20, 1987

[30] Foreign Application Priority Data

Oct. 21, 1986 [JP] Japan .................. 61-249900

[51] Int. Cl.⁴ ........................... B23Q 3/157
[52] U.S. Cl. ................................. 29/568
[58] Field of Search ............. 29/568, 26 A; 408/35; 51/168

[56] References Cited

U.S. PATENT DOCUMENTS

| | | | |
|---|---|---|---|
| 4,110,897 | 9/1978 | Hipwell et al. | 29/568 |
| 4,216,572 | 8/1980 | Matsushita et al. | 29/568 |
| 4,428,256 | 1/1984 | Ida et al. | 29/568 X |
| 4,510,669 | 4/1985 | Ida et al. | 29/568 |
| 4,542,576 | 9/1985 | Yamanaga et al. | 29/568 |
| 4,646,421 | 3/1987 | Jaissle et al. | 29/568 |
| 4,646,423 | 3/1987 | Schlesinger et al. | 29/568 |
| 4,675,977 | 6/1987 | Kolblin et al. | 29/568 |
| 4,713,876 | 12/1987 | Takagi et al. | 29/568 |

FOREIGN PATENT DOCUMENTS

| | | | |
|---|---|---|---|
| 0071013 | 4/1983 | Japan | 29/568 |
| 61-13923 | 4/1986 | Japan | 29/568 |
| 2108019 | 5/1983 | United Kingdom | 29/568 |

Primary Examiner—William R. Briggs
Attorney, Agent, or Firm—Roberts, Spiecens & Cohen

[57] ABSTRACT

In multi-spindle head-replacing type machine tool comprising a machining unit disposed on a base for advancing and retreating movements between an original position and a machining position, a first annular guide rail including a movable rail integral with the machining unit and a stationary rail to surround the machining unit which is located in the original position, a second annular guide rail disposed concentrically with and at a place axially offset from the first guide rail, a plurality of multi-spindle heads travellably carried on each of the first and second guide rails, first and second index mechanisms releasably connected respectively to the multi-spindle heads on the first and second guide rails for driving such multi-spindle heads for angular displacement, and an elevator mechanism disposed sideways from the first and second guide rails at a place offset from the movable rail for providing replacement of the multi-spindle heads between the first and second guide rails, a part of the stationary rail of the first guide rail and a part of the second guide rail are divided as lift rails in a circular arc at a place corresponding to the elevator mechanism, respectively, and the elevator mechanism comprises an elevator connected to each of the lift rails of the first and second guide rails, and lift-drive means connected to the elevator which is to be raised and lowered between the first and second guide rails.

5 Claims, 14 Drawing Sheets

MULTI-SPINDLE HEAD-REPLACING MACHINE TOOL

BACKGROUND OF THE INVENTION

1. Field of the Invention

The present invention relates to a multi-spindle head-replacing type machine tool comprising a machining unit disposed on a base for advancing and retreating movements between an original position and a machining position, a first annular guide rail including a movable rail integral with the machining unit and a stationary rail to surround the machining unit which is located in the original position, a second annular guide rail disposed concentrically with and at a place axially offset from the first guide rail, a plurality of multi-spindle heads travellably carried on each of the first and second guide rails, first and second index mechanism releasably connected respectively to the multi-spindle heads on the first and second guide rails for driving such multi-spindle heads for angular displacement, and an elevator mechanism disposed sideways from the first and second guide rails at a place offset from the movable rail for providing replacement of the multi-spindle heads between the first and second guide rails.

2. Description of the Prior Art

Such multi-spindle head-replacing type machine tool is conventionally known from Japanese Patent Publication No. 13923/86.

With the above conventional machine tool, however, a lift mechanism and a shift mechanism are required for transferring of a multi-spindle head between the first and second guide rails and the elevator mechanism, resulting in a complicated construction. In addition, a space must be left in the second guide rail for replacement of the multi-spindle, resulting in a correspondingly decreased amount of multi-spindle heads stored.

SUMMARY OF THE INVENTION

The present invention has been accomplished with the such circumstances in view, and it is an object of the present invention to provide a multi-spindle head-replacing type machine tool, wherein a mechanism for transferring of a multi-spindle head between the first and second guide rails and the elevator mechanism is simplified, while increasing the amount of multi-spindle heads stored.

According to the present invention, a part of the stationary rail of the first guide rail and a part of the second guide rail are divided as a lift rail in a circular arc at a place corresponding to the elevator mechanism, respectively, and the elevator mechanism comprises an elevator connected to each of the lift rails of the first and second guide rails, and lift-drive means connected to the elevator which is to be raised and lowered between the first and second guide rails.

With the above construction, the multi-spindle head can be moved between the first and second guide rails and moreover, when the lift rail of the first guide rail is moved to the second guide rail, one multi-spindle head stored on the second guide rail is retreated outwardly. Therefore, the same number of multi-spindle heads can be stored on the first and second guide rails. This makes it possible to increase the amount of multi-spindle heads stored as compared with the prior art and to simplify the arrangement for replacing movement.

It is another object of the present invention to provide a multi-spindle head-replacing type machine tool wherein the multi-spindle heads are smoothly replaced depending upon a variation in type of works, and a machining efficiency is improved.

It is a further object of the present invention to provide a multi-spindle head-replacing type machine tool wherein the rising and lowering motions of the multi-spindle head are stabilized.

The above and other objects, features and advantages of the invention will become apparent from reading of the following description of the preferred embodiments taken in conjunction with the accompanying drawings.

BRIEF DESCRIPTION OF THE DRAWINGS

The drawings illustrating one embodiment of the present invention will be briefly described below.

DESCRIPTION OF THE PREFERRED EMBODIMENTS

Figure 1:
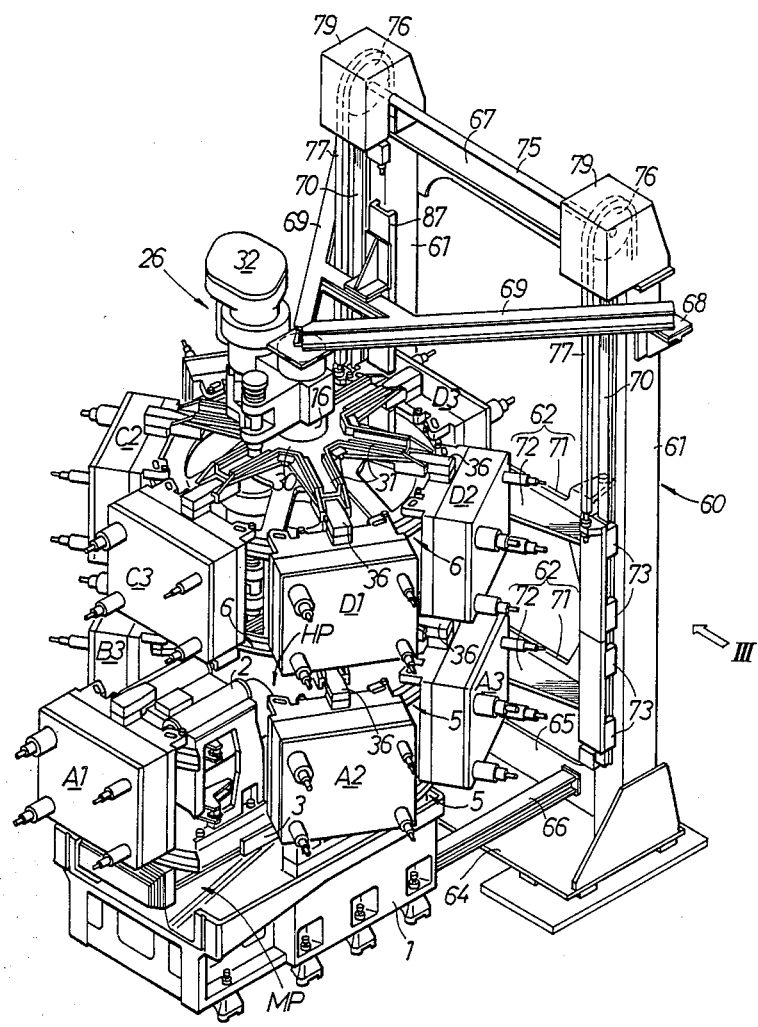
FIG. 1 is a perspective view of the whole of a multi-spindle head-replacing type machine tool.
Figure 2:
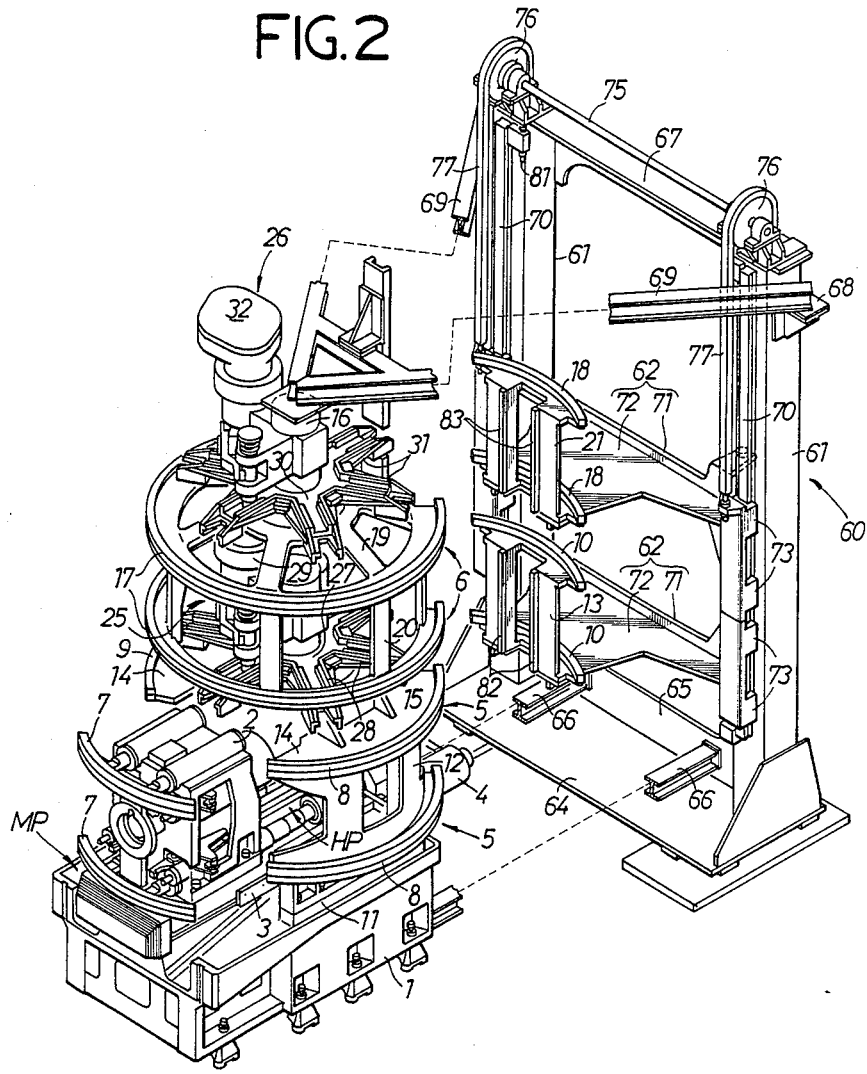
FIG. 2 is an exploded perspective view of the machine tool, with multi-spindle heads shown in FIG. 1 being removed for simplification.

The present invention will now be described by way of one embodiment with reference to the accompanying drawings. Referring first to FIGS. 1 and 2, a machining unit 2 is disposed on a base 1 fixedly mounted on a floor surface for advancing and retreating movements between an original position HP in the center thereof and a machining position MP at a side end thereof. More specifically, a pair of parallel guide members 3 for guiding the advancing and retreating movements of the maching unit are disposed on the base 1, so that the machining unit 2 is guided on the guide members 3 to advance and retreat between the original position HP and the machining position MP. A motor 4 for the movements is also fixedly supported on the base 1 and connected to the machining unit 2.

A pair of first upper and lower annular guide rails 5 are disposed to surround the machining unit 2 located in the original position HP, and a pair of second upper and lower annular guide rails 6 are disposed above the first guide rails 5 at a vertically spaced apart distance equal to that between the first guide rails 5. Moreover, the first and second guide rails 5 and 6 have center points aligned with each other and their radii set at the same value.

Figure 3:
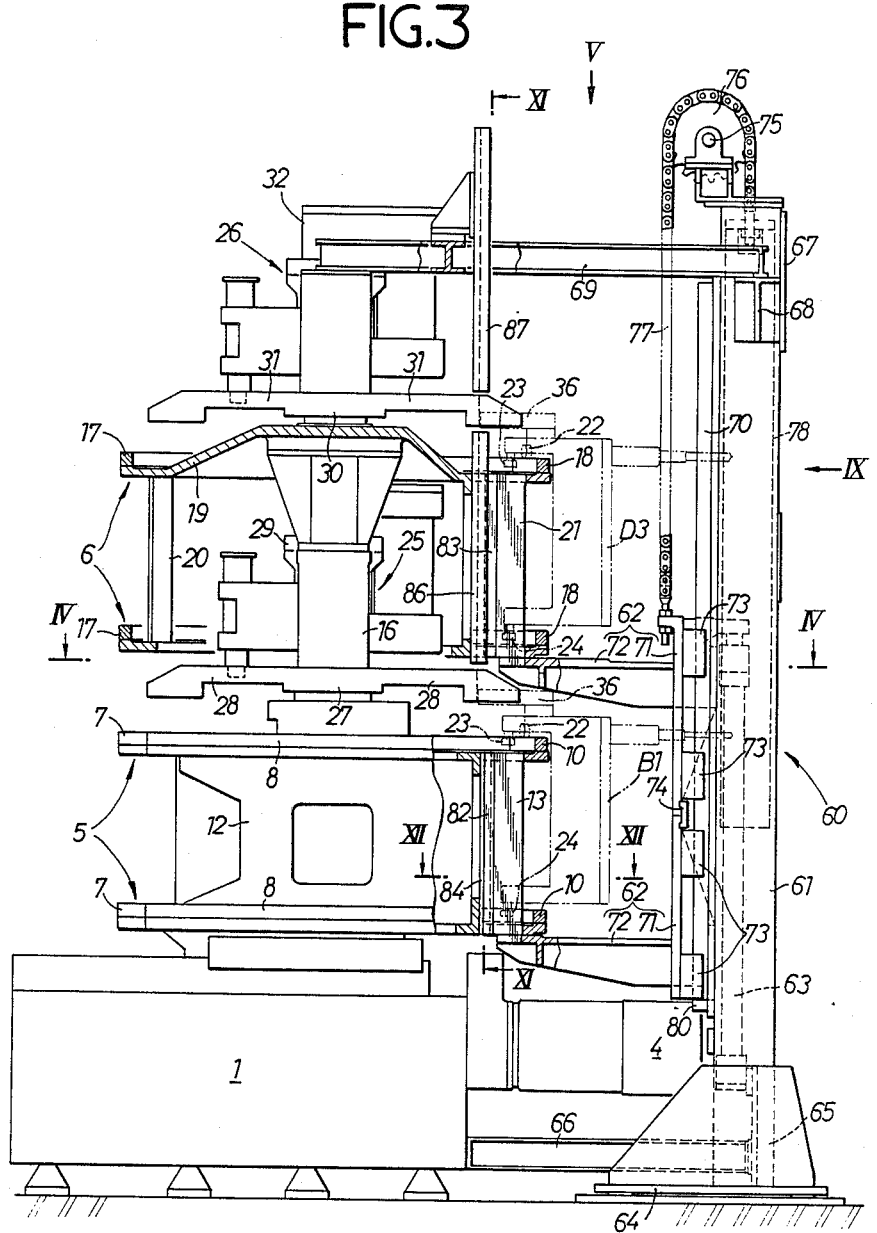
FIG. 3 is a partially cut-away schematic side view taken in a direction indicated by an arrow III in FIG. 1.
Figure 4:
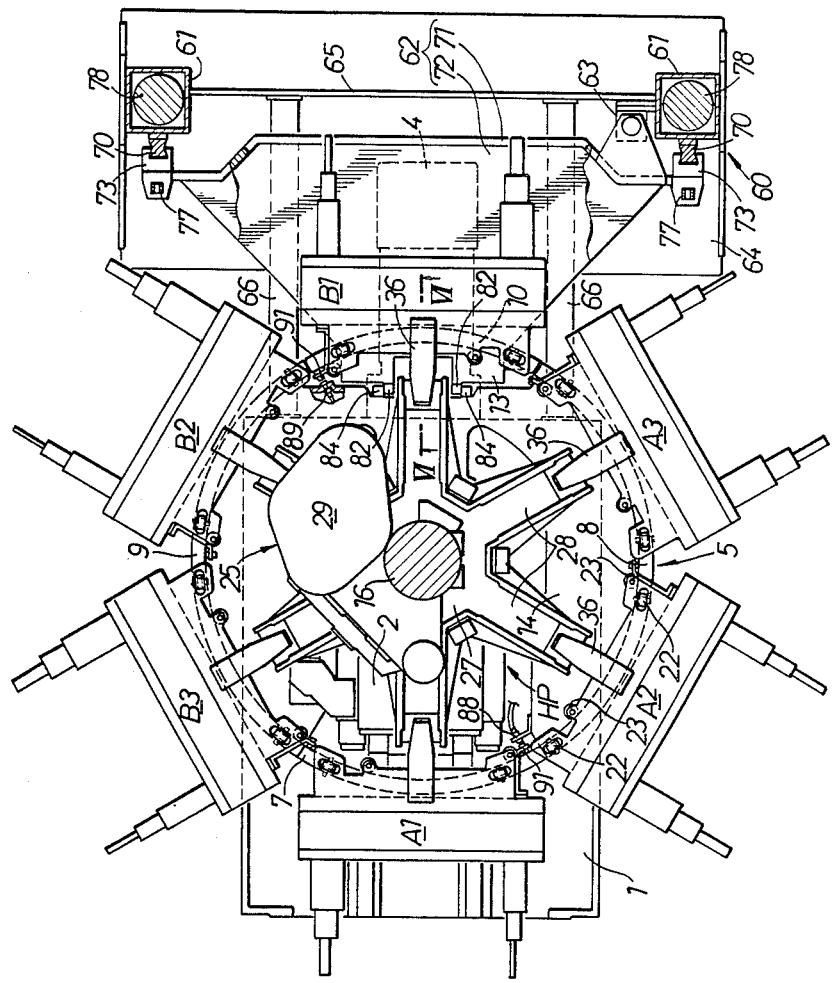
FIG. 4 is a sectional view taken along a line IV—IV in FIG. 3.

Referring also to FIGS. 3 and 4, the first guide rail 5 is formed into an annular configuration by a movable rail 7, a pair of stationary rails 8 and 9, and a lift rail 10. The movable rail 7 is disposed in a place corresponding to the machining position MP, and the lift rail 10 is disposed at the opposite side from the movable rail 7 with respect to the center of the first guide rail 5. The stationary rails 8 and 9 are formed into a circular arc having a central angle, for example, of 115 degree, so as to connect the movable rail 7 and the lift rail 10, and are fixed on the base 1. More specifically, the stationary rails 8 and 9 of the first lower guide rail 5 are fixed on the base 1 through leg members 11, respectively, and the pairs of upper and lower stationary rails 8 and 9 are integrally formed through side plates 12 curved in a circular arc, respectively. The pair of upper and lower movable rails 7 are also integral with the machining unit 2, so that they can be moved in unison with the machining unit 2. Further, the pair of upper and lower lift rails 10 are integrally formed through rail supports 13.

A horizontal support plate 14 is integrally provided on each of the stationary rails 8 and 9 in the first upper guide rail 5, and a vertically extending post 16 is fixedly supported at its lower end concentrically with the first and second guide rails 5 and 6 by a plurality of support legs 15 which are mounted to extend inwardly from the support plates 14.

Figure 5:
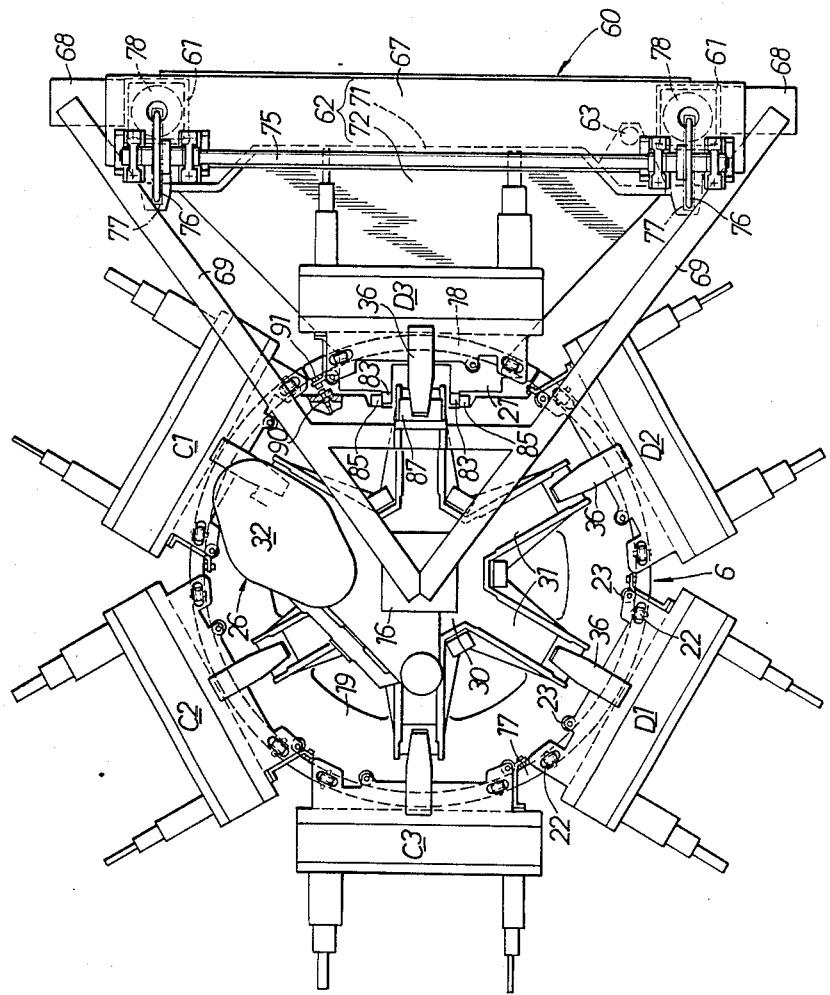
FIG. 5 is a view taken in a direction indicated by an arrow V in FIG. 3.

Referring also to FIG. 5, the second guide rail 6 is formed into an annular shape by a stationary rail 17 and a lift rail 18 which is formed into a circular arc having the same central angle as that of the lift rail 10 in the first guide rail 5 and which is disposed at a place corresponding to that of the lift rail 10.

The stationary rail 17 in the second upper guide rail 6 is securely mounted on a support plate 19 projecting radially outwardly from a central portion of the post 16, the pair of upper and lower stationary rails 17 being integral with each other through a plurality of connecting plates 20 circumferentially spaced apart from one another. The pair of upper and lower lift rails 18 are also integral with each other through rail supports 21.

A plurality of, e.g., six types of multi-spindle heads A1, A2, A3, B1, B2 and B3 are travellably carried on the first guide rails 5, while a plurality of, e.g., six types of multi-spindle heads C1, C2, C3, D1, D2 and D3 are travellably carried on the second guide rails 6. More specifically, rotatably supported on an upper portion of each of the multi-spindle heads A1 to A3, B1 to B3, C1 to C3 and D1 to D3 are a pair of wheels 22 rollable on the corresponding upper surfaces of the first upper guide rail 5 and the second upper guide rail 6, and a pair of wheels 23 rollable along inner side surfaces of the first and second upper guide rails 5 and 6, while rotatably supported on a lower portion of each of the multi-spindle heads A1 to A3, B1 to B3, C1 to C3 and D1 to D3 are a pair of wheels 24 rollable along the corresponding inner and outer surfaces of the first and second lower guide rails 5 and 6.

In the individual multi-spindle heads A1 to A3, B1 to B3, C1 to C3 and D1 to D3, the use of the reference characters in combination of the letters A, B, C and D with the numerals 1, 2 and 3 is for convenience to represent the corresponding works and steps, wherein the letters A, B, C and D designate the types of the corresponding works, and the numerals 1, 2 and 3 denote the machining steps, for example, the numeral 1 being used for a drilling step, the numeral 2 being for a tapping step, and the numeral 3 being for a reaming step.

The multi-spindle heads A1 to A3 and B1 to B3 travellable along the first guide rails 5 are driven for angular displacement by a first index mechanism 25, so that any one of the multi-spindle heads A1 to A3 and B1 to B3 is placed at a location corresponding to the movable rails 7 or the lift rails 10. On the other hand, the multi-spindle heads C1 to C3 and D1 to D3 travellable along the second guide rails 6 are driven for angular displacement by a second index mechanism 26, so that any one of the multi-spindle heads C1 to C3 and D1 to D3 is placed at a location corresponding to the lift rails 18.

The first index mechanism 25 comprises a turn plate 27 rotatably carried on a middle portion of the post 16, index arms 28 mounted respectively at a plurality of, e.g., six circumferentially spaced apart places to extend radially outwardly from the turn plate 27, and a drive source 29 for driving the turn plate 27 for angular displacement. The second index mechanism 26 is of a construction basically similar to that of the first index mechanism 25 and comprises a turn plate 30, index arms 31 and a drive source 32.

A leading end of each of the index arms 28 and 31 releasably engages such of locking blocks 36 respectively fixedly mounted on upper portions of the multi-spindle heads A1 to A3, B1 to B3, C1 to C3 and D1 to D3.

Figure 6:
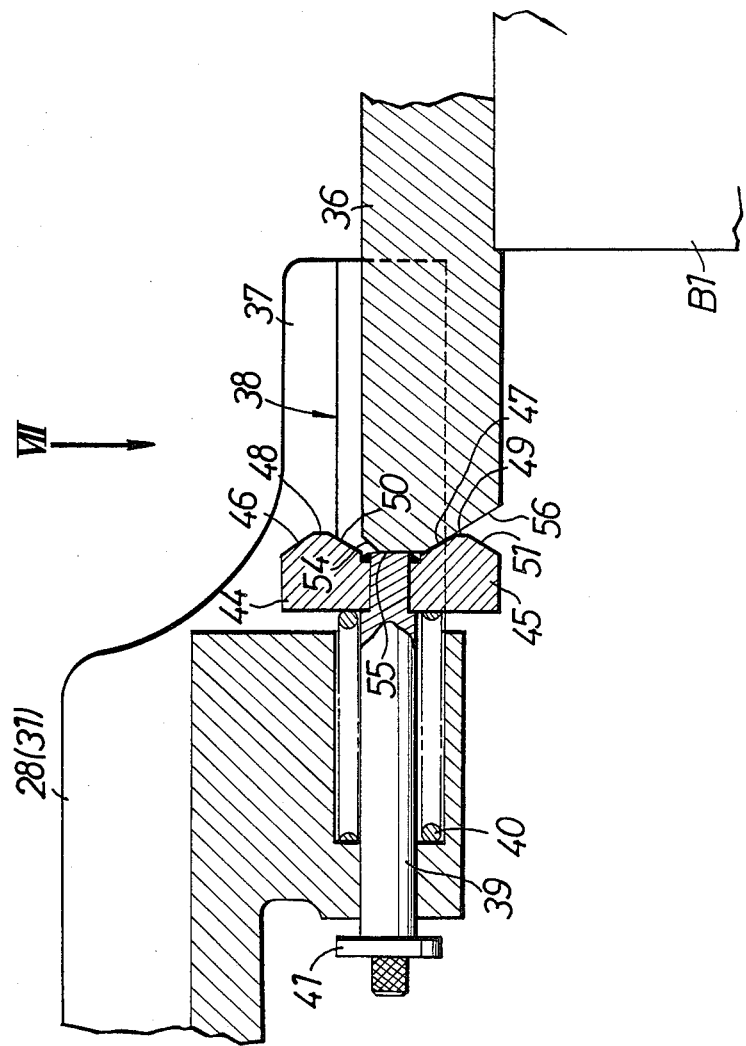
FIG. 6 is an enlarged sectional view taken along a line VI—VI in FIG. 4.
Figure 7:
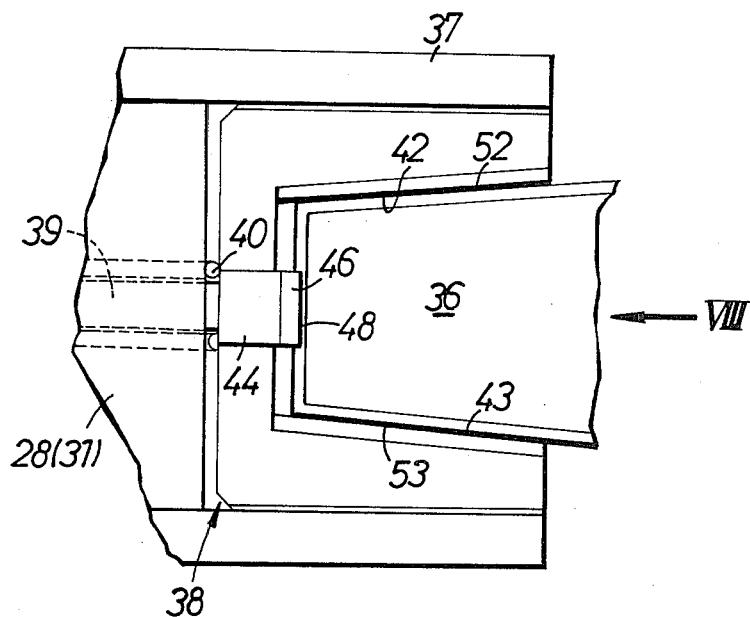
FIG. 7 is a view taken in a direction indicated by an arrow VII in FIG. 6.
Figure 8:
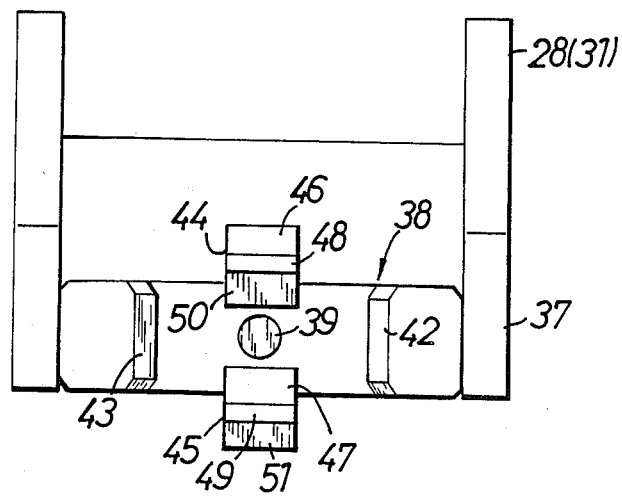
FIG. 8 is a view taken in a direction indicated by an arrow VIII in FIG. 7, with a locking block being removed.

Referring to FIGS. 6, 7 and 8, each of the index arms 28 and 31 is formed at its leading end with a substantially U-shaped guide portion opened to each of the multi-spindle heads A1 to A3, B1 to B3, C1 to C3 and D1 to D3 in a horizontal plane. A substantially U-shaped engage member 38 is slidably fitted in the guide portion 37 for movement toward and away from each of the multi-spindle heads A1 to A3, B1 to B3, C1 to C3 and D1 to D3. A guide shaft 39 inserted through the index arm 28, 31 is fixedly mounted on the engage member 38, and a spring 40 is interposed between the index arm 28, 31 and the engage member 38 to surround the guide shaft 39, so that the engage member 38 is resiliently biased toward each of the multi-spindle heads A1 to A3, B1 to B3, C1 to C3 and D1 to D3. Moreover, a stopper 41 is securely mounted on an end of the guide shaft 39 projecting from the index arm 28, 31 and is adapted to engage the index arm 28, 31, so that the engage member 38 biased by the spring 40 is prevented from being disengaged from the index arm 28, 31.

The engage member 38 is formed on its opposed inner surfaces respectively with engage slants 42 and 43 inclined toward each other as distanced away from each of the multi-spindle heads A1 to A3, B1 to B3, C1 to C3 and D1 to D3. The engage member 38 is also integrally formed at its central upper and lower portions respectively with guide protrusions 44 and 45 projecting toward each of the multi-spindle heads A1 to A3, B1 to B3, C1 to C3 and D1 to D3. Each of the guide protrusions 44 and 45 is formed at its leading end face with a first guide surface 46, 47 inclined toward the leading end as approaching the top thereof, a second vertical guide surface 48, 49, and a third guide surface 50, 51 inclined toward the leading end as approaching the top thereof.

On the other hand, a locking block 36 is securely mounted on an upper portion of each of the multi-spindle heads A1 to A3, B1 to B3, C1 to C3 and D1 to D3 to project toward the index arm 28, 31. The locking block 36 has outer side surfaces 52 and 53 opposed to the engage slants 42 and 43 and inclined toward each other as approaching the leading end. The locking block 36 is also provided at its leading end with a first abutment surface 54 inclined to conform to the third guide surfaces 50 and 51, a second abutment surface 55 vertical to conform to the second guide surfaces 48 and 49, and a third abutment surface 56 inclined to conform to the first guide surfaces 46 and 47.

With such structure of the leading end of the index arm 28, 31 and with such structure of the locking block 36, when the locking block 36, i.e., each of the multi-spindle heads A1 to A3, B1 to B3, C1 to C3 and D1 to D3 is moved up in a condition of the locking block 36 being placed in engagement with the engage member 38 by allowing the outer side surfaces 52 and 53 to abut against the engage slants 42 and 43 and allowing the third abutment surface 56 to abut against the first guide surface 47, the first abutment surface 54 is caused to abut against the third guide surface 50, so that the engage member 38 is urged against a spring force of the spring 40, whereby the outer side surfaces 52 and the engage slants 42 and 43 get clear of each other into disengagement. When the locking block 36, i.e., each of the multi-spindle heads A1 to A3, B1 to B3, C1 to C3 and D1 to D3 has moved up from the lower portion of the index arm 28, 31, the first abutment surface 54 is caused to abut against the third guide surface 51 of the engage member 38 resiliently biased by the spring 40 to push the engage member 38. Then, when the third abutment surface 56 has moved up to a position corresponding to the first guide surface 47, the engage member 38 advances until it causes the first guide surface 47 to abut against the third abutment surface 56, so that the engage slants 42 and 43 abut against the outer opposed surfaces 52 and 53 of the locking block 36 to provide the engagement of the index arm 28, 31 with each of the multi-spindle heads A1 to A3, B1 to B3, C1 to C3 and D1 to D3. The same can be said even when each of the multi-spindle heads A1 to A3, B1 to B3, C1 to C3 and D1 to D3 has moved down from the above.

An elevator mechanism 60 is disposed sideways from the first and second guide rails 5 and 6 at a place corresponding to the lift rails 10 and 18.

Figure 9:
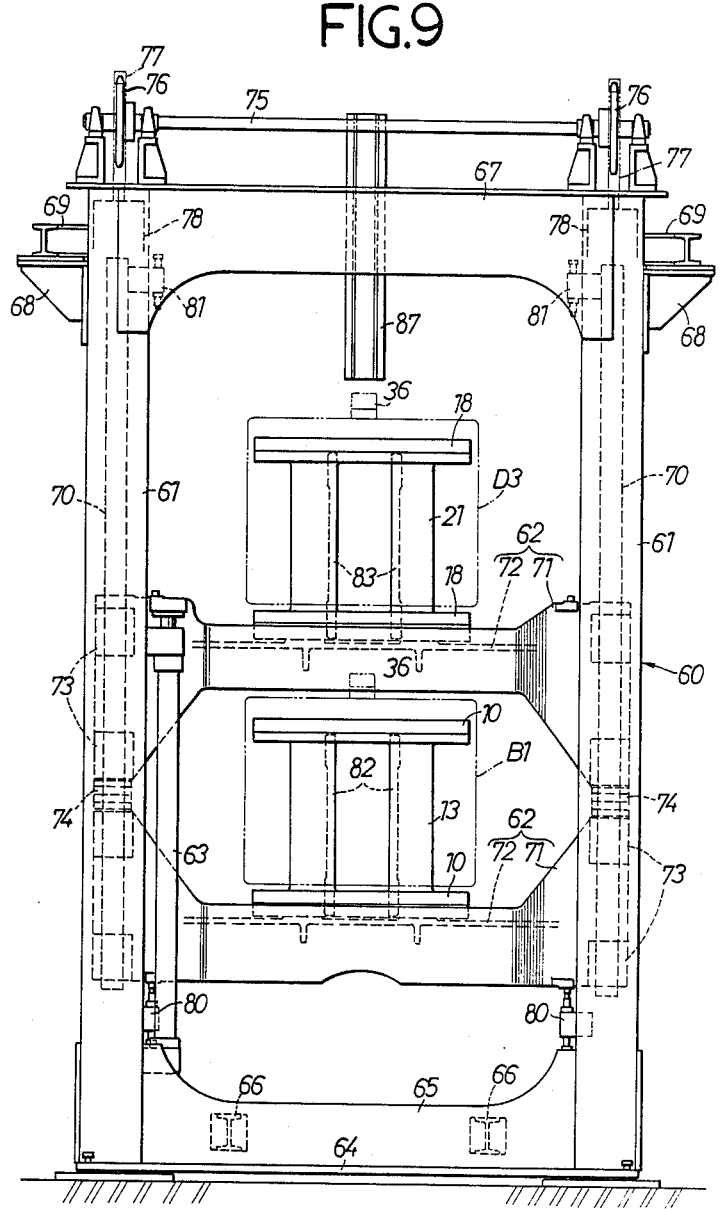
FIG. 9 is a view taken in a direction indicated by an arrow IX in FIG. 3.

Referring to FIG. 9, the elevator mechanism 60 comprises a pair of vertically extending guide pillars 61, a pair of upper and lower elevators 62 liftable along the guide pillars 61, and lift-drive means 63 for liftably driving the elevators 62.

A base plate 64 is disposed on the floor surface sideways from the base 1, and the guide pillars 61, each of which is in the form of a column having a square cross-section, are rised on the base plate 64 at a distance spaced apart from each other. The guide pillars 61 are interconnected at their lower portions by a connecting plate 65 which is connected with the base 1 by a pair of connecting members 66 formed on an I-shaped beam. The guide pillars 61 are also interconnected at their upper portions by a connecting plate 67. A bracket 68 is fixedly mounted on each of those upper side surfaces of the guide pillars 61 which are farther from each other, and a connecting member 69, for example, formed of an I-shaped beam, is connected at one end to the bracket 68. The other ends of the connecting members 69 are commonly secured to the upper portion of the post 16.

In this manner, the guide pillars 61 are substantially integral at their upper and lower portions with the base 1 and stably supported.

A vertically extending lift-guide member 70 is fixedly mounted on a side surface of each of the guide pillars 61 which is closer to the base 1, so that the elevator 62 is lifted along the corresponding guide member 70. More specifically, each of the elevators 62 comprises a horizontal plate 72 extending toward the base 1 and fixedly mounted on and perpendicularly to a lower portion of a vertical plate 71 extending transversely between both of the guide pillars 61, and a pair of fit legs 73 fitted in each of the guide members 70 are mounted on the opposite ends of each of the vertical plates 71.

The lifters 62 are interconnected through a connecting member 74, and the lift-drive means 63 is connected to the upper elevator 62. The lift-drive means 63 is, for example, a hydraulic cylinder, and is supported on one of the guide pillars 61 to extend vertically. Thus, both of the elevators 62 are driven along the guide members 70 by the lift-drive means 63.

A pair of sprocket wheels 76 are rotatably supported respectively on the upper ends of the guide pillars 61 and are associated with a common shaft 75 for sychronous rotation, and chains 77 wound around the sprocket wheels 76 are connected at their one ends to the upper elevator 62, respectively. The other ends of the chains 77 are inserted into the guide pillars 61 from their upper ends and connected to balance weights 78 liftable within the guide pillars 61, respectively.

Each of the sprocket wheels 76 is covered by a cover 79 mounted on the upper end of the guide pillar 61. A stopper 80 is mounted on the lower end of each of the guide members 70 and adapted to abut against the lower elevator 62 to establish a lower limit position for that elevator 62, while a stopper 81 is mounted on the upper end of each of the guide members 70 and adapted to abut against the upper elevator 62 to establish an upper limit position for that elevator 62.

Figure 10:
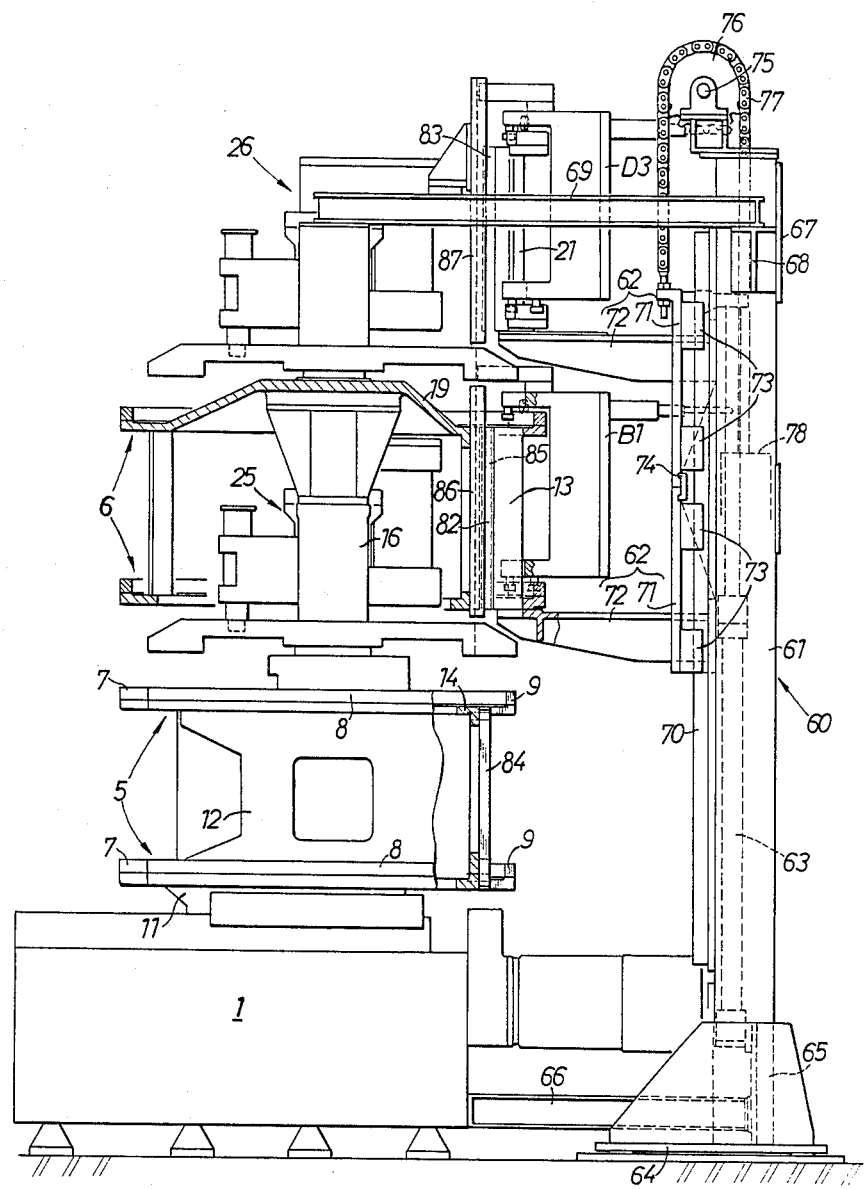
FIG. 10 is a side view similar to FIG. 3, with an elevator mechanism having been raised.

With the horizontal plates 72 interconnected by the connecting member 74, the distance between the horizontal plates 72 of the elevators 62 corresponds to that between the first lower guide rail 5 and the second lower guide rail 6, and the horizontal plates 72 of the elevators 62 are connected to the lift rails 10 and 18 in the first and second lower guide rails 5 and 6, respectively. Thus, with rising and lowering movements of the elevators 62, the lift rails 10 and 18 also move up and down. The upper and lower limit positions of the elevators 62, i.e., the mounting places for the stoppers 80 and 81 are set so that when the elevators 62 are in their lower limit positions, the lift rails 10 are in positions corresponding to the first guide rails 5 and at the same time, the lift rails 18 are in positions corresponding to the second guide rails 6, while when the elevators 62 are in their upper limit positions, the lift rails 10 are in positions corresponding to the second guide rails 6, as shown in FIG. 10.

Figure 11:
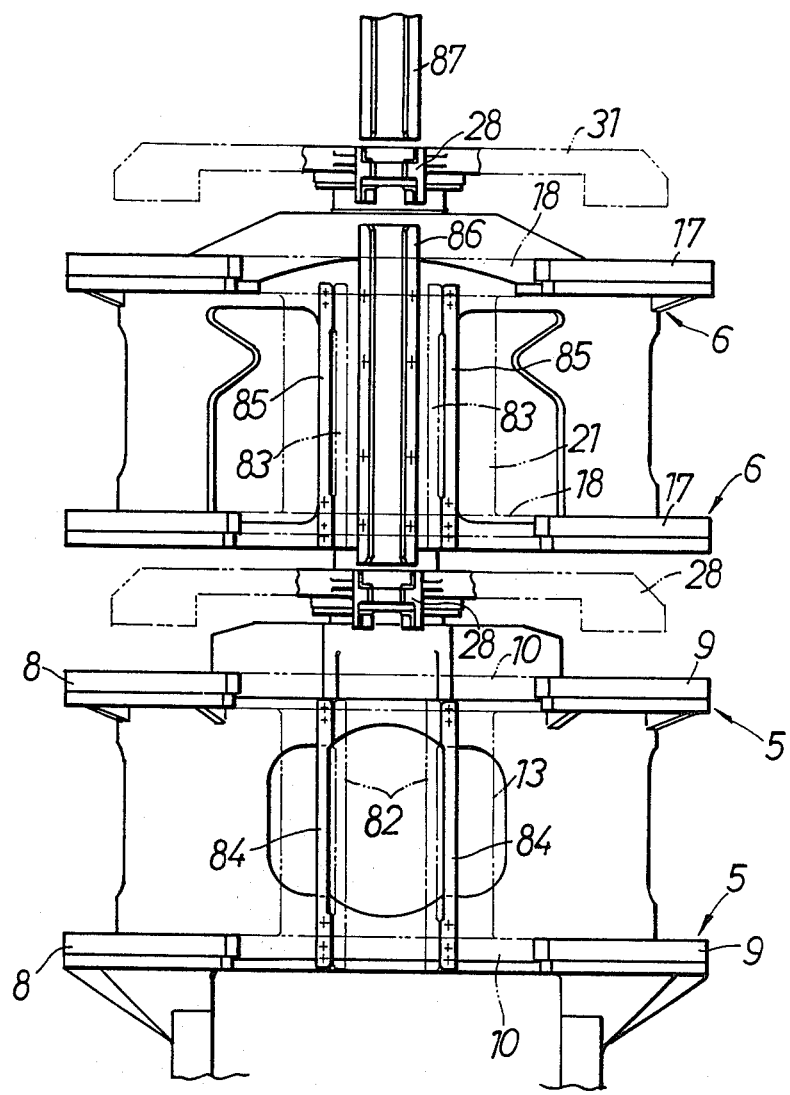
FIG. 11 is a view taken along a line XI—XI in FIG. 3.
Figure 12:
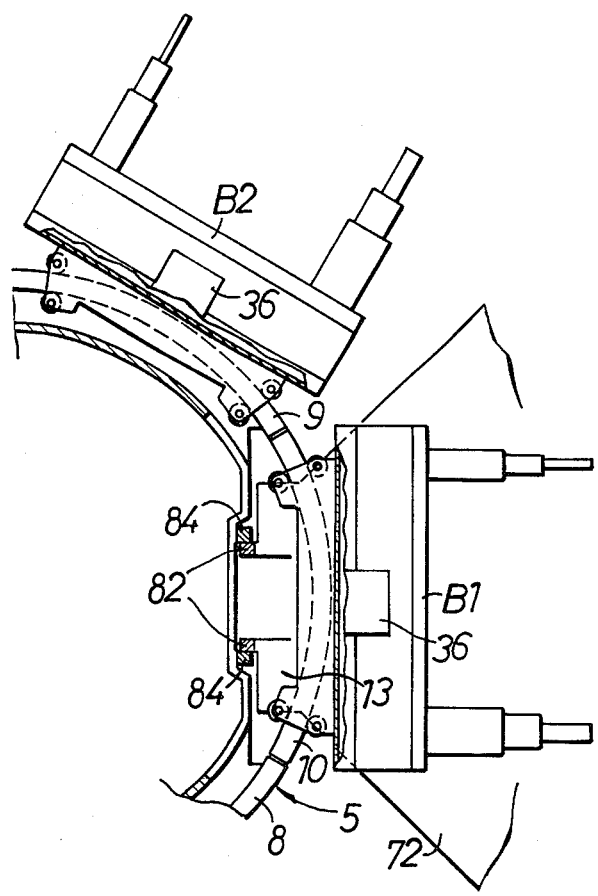
FIG. 12 is a sectional view taken along a line XII—XII in FIG. 3.

Referring to FIGS. 11 and 12, a pair of support guides 82, 82; 83 are fixedly mounted on the rail supports 13; 21 connecting the lift rails 10, 10; 18, 18 to extend vertically at a distance larger than a width of the locking block 36. Guide bars 84 slidable on the support guides 82 extend vertically between the first guide rails 5 and are fixed to the support plates 14, respectively, while guide bars 85 slidable on the support guides 82 and 83 extend vertically between the second guide rails 6 and are fixed to support plates 19. This stabilizes the rising and lowering motions of the elevators 62.

Between the index arms 28 and 31 which are in their position corresponding to the lift rails 10 and 18, a head guide member 86 is fixed to the support plate 19 to extend vertically and adapted to be fitted to the leading end of the locking block 36 for guiding of rising and lowering movements of each of the multi-spindle heads A1 to A3, B1 to B3, C1 to C3 and D1 to D3 and further, a head guide member 87 is fixed to the connecting member 69 to extend vertically above the index arm 31. The head guide members 86 and 87 stabilize the rising and lowering motions of the locking block 36 and thus each of the multi-spindle heads A1 to A3, B1 to B3, C1 to C3 and D1 to D3.

Referring back to FIG. 4, detectors 88 and 89 are mounted on the support plates 14 integral with the stationary rails 8 and 9 in the first upper guide rail 5 for detecting the type of the multi-spindle heads A1 to A3, B1 to B3, C1 to C3, and D1 to D3 locate in positions corresponding to the movable rail 7 and the lift rail 10, and a signal generator 91 is mounted on each of the multi-spindle heads A1 to A3, B1 to B3, C1 to C3 and D1 to D3 for generating a signal depending upon the type when it is located in opposition to the detectors 88 and 89.

Referring to FIG. 5, a detector 90 is mounted on the support plate 19 integral with the stationary rail 17 of the second upper guide rail 6 for receiving a signal in opposition to the signal generator 91 of one of the multi-spindle head A1 to A3, B1 to B3, C1 to C3 and D1 to D3 which is located in a position corresponding to the lift rail 18.

Figure 13:
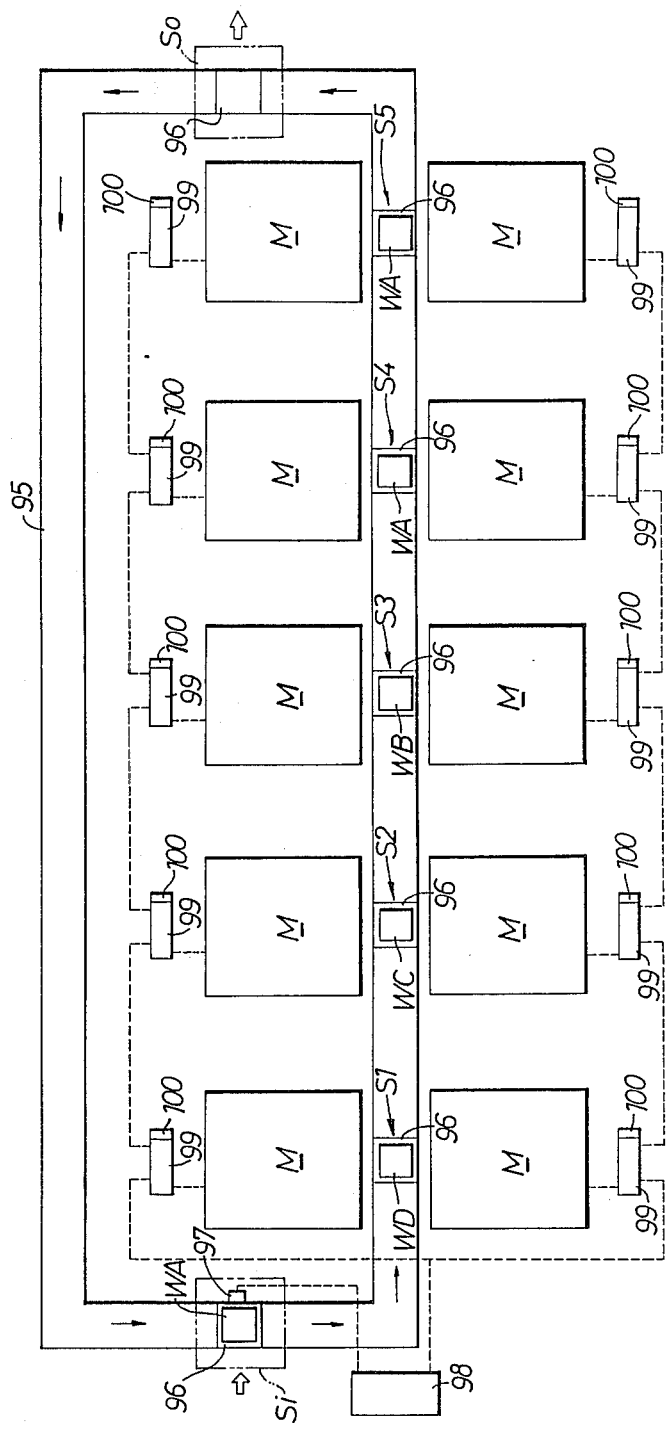
FIG. 13 is a schematic diagram illustrating an arrangement of multi-spindle head-replacing type machine tools.

Referring to FIG. 13, multi-spindle head-replacing type machine tools M are constructed in the above manner. Each pair of the machine tools M is disposed at a plurality of, e.g., five machining stations S1, S2, S3, S4 and S5 so as to machine from the opposite sides a plurality of, e.g., four types of works WA, WB, WC and WD intermittently transported. More specifically, a conveyor 95 is disposed in an endless manner to pass the machining stations S1 to S5 successively, and the machine tools M are arranged respectively at opposite sides of the conveyor 95 at a place corresponding to each of the machining stations S1 to S5.

A plurality of pallets 96 are placed on the conveyor 95, so that one of the plural types of works WA, WB, WC and WD is placed onto the pallet 96 in a loading station Si which is set at a stationary location before entering each of the machining stations S1 to S5. Also, an unloading station So is set at a stationary location after passing each of the machining stations S1 to S5, so that each of the works WA, WB, WC and WD which has been machined at each of the machining stations S1 to S5 is unloaded from the pallet 96 at the unloading station So. Moreover, the unloaded pallet 96 circulates to the loading station Si.

A work detector 97 is disposed at the loading station Si for detecting which work WA, WB, WC or WD is supplied to the loading station Si, so that a signal resulting from the detection in the work detector 97 is delivered into a total control panel 98. On the other hand, a sequence control 99 and a CNC system are added to each of the machine tools M, so that a signal indicative of the type of the work which has been supplied to the loading station Si is transmitted from the total control planel 98 to each of the sequence controls 99.

In each of the machine tools M, it has been detected which multi-spindle head A1 to A3, B1 to B3, C1 to C4 or D1 to D3 is engaged with either of the index arms 28 or 31, through reading-out of a signal from the generator 91 by the detector 89, 90, and date therefor have been stored in the sequence control 99. Signals indicative of command to read-out the multi-spindle head and of machining command are delivered from the CNC system 100 into the sequence control 99, whereby comparison of these signals with the dada stored in the sequence control 99 causes a desired multi-spindle head to move toward the machining position MP. In this case, when a desired multi-spindle head is located on the first guide rails 5, the operation of only the first index mechanism 25 causes such head to move toward the machining position MP, but when a desired multi-spindle head is located on the second guide rails 6, the operations of the elevator mechanism 60 and the second index mechanism 26 cause such desired multi-spindle head to be brought down onto the first guide rails 5 and then, the first index mechanism 25 causes such head to move toward the machining position MP.

Signals indicative of the type of the work and indicative of the numbers of stations and steps from the loading station Si to a selected station are delivered as reference commands from the total control panel 98 into the sequence control 99, whereby multi-spindle heads to be prepared are searched by comparison of the reference command signals with the data stored in the sequence control 99 and are caused to sequentially move toward the first guide rails 5 by command from the sequence control 99.

Figure 14E:
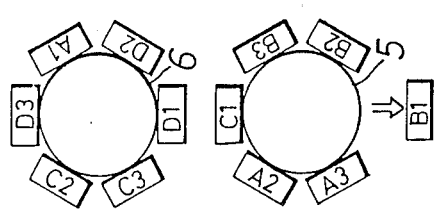
FIGS. 14(a) to 14(j) are diagrams for explaining motions for replacing the multi-spindle heads in succession.
Figure 14D:
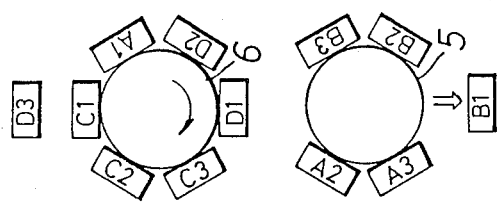
Figure 14C:
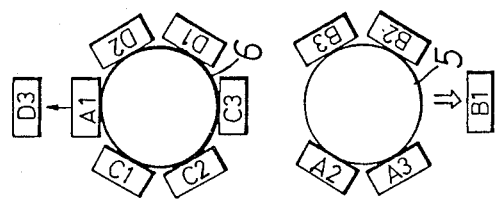

The operation of this embodiment will be described below in conjunction with FIGS. 14(a) to 14(j). Suppose that the multi-spindle heads A1 to A3 and B1 to B3 have been placed successively on the first guide rails 5, while the multi-spindle heads C1 to C3 and D1 to D3 have been placed successively on the second guide rails 6, as shown in FIG. 14(a), for example, when works WA, WB, WC and WD are intended to be delivered in this order and subjected successively to three steps of drilling, tapping and reaming in a certain machine tool M.

In this case, the multi-spindle head A1 is brought into the machining position MP to effect drilling of a work WA and then, the multi-spindle heads A2 and A3 are sequentially brought into the machining position MP to effect tapping and reaming of the work WA in sequence.

Figure 14B:
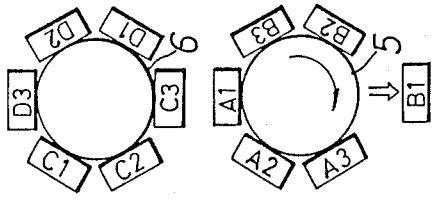
Figure 14A:
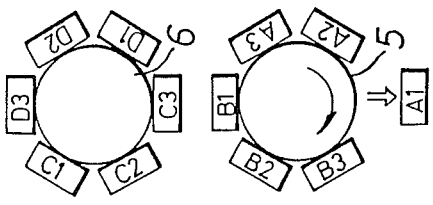

Thereafter, with the transporting of a work WB, the multi-spindle head B1 is brought into the machining position MP as shown in FIG. 14(b) to effect drilling of the work WB. Because the multi-spindle heads C1, C2 and C3 for a work which will be subsequently transported are located on the second guide rails 6 at this time, the multi-spindle head C1 is moved from the second guide rails 6 to the first guide rails 5 during machining by the multi-spindle head B1.

That is, the multi-spindle heads A1 and D3 which are in their positions corresponding to the lift rails 10 and 18 are raised to the upper limit positions by the elevator mechanism 60, as shown in FIG. 14(c). This causes the multi-spindle head A1 to move up to a position corresponding to the second rails 6 and also causes the multi-spindle head D3 to retreat upwardly from the second guide rails 6. In this case, the data for the retreated multi-spindle head D3 is erased from the sequence control 99, and data for the multi-spindle head A1 from the signal generator 91 is read out in the detector 90, whereby a relationship between the index arm 31 in the second index mechanism 26 and the multi-spindle head A1 is newly stored in the sequence control 99.

Then, the multi-spindle heads C1 to C3, D1, D2 and A1 are driven by the second index mechanism 26 to be angularly displaced through 60° in a clockwise direction along the second guide rails 6, as shown in FIG. 14(d). Consequently, the multi-spindle head C1 is brought into a position corresponding to the lift rails 18.

Thereupon, the elevator mechanism 60 is lowered as shown in FIG. 14(e) to move down the multi-spindle head D3 to its position corresponding to the second guide rails 6 and also to move down the multi-spindle head C1 to its position corresponding to the first guide rails 5. In this case, a relationship between the multi-spindle head D3 and the index arm 31 of the second index mechanism 26 is stored again in the sequence control 99, while the data for the multi-spindle head C1 corresponding to the second index mechanism 26 in the sequence control 99 is stored in association with the index arm 28 of the first index mechanism 25.

Such motion is done in the same manner even at machining by the multi-spindle heads B2 and B3. At machining by the multi-spindle head B2, the multi-spindle head C2 is lowered from the second guide rails 6 onto the first guide rails 5, and at machining by the multi-spindle head B3, the multi-spindle head C3 is lowered from the second guide rails 6 onto the first guide rails 5. Moreover, for replacement with the multi-spindle heads C2 and C3, the multi-spindle head A2 and A3 are moved from the first guide rails 5 to the second guide rails 6.

Thus, when a work WC has been transported after machining of the work WB, the multi-spindle heads C1, C2 and C3 can be sequentially brought into the machining position MP to effect sequential machinings by the individual multi-spindle heads C1, C2 and C3.

During such machining by the multi-spindle heads C1, C2 and C3, the multi-spindle heads D1, D2 and D3 are lowered from the second guide rails 6 onto the first guide rails 5 to provide for a work WD which will be subsequently transported.

Figure 14J:
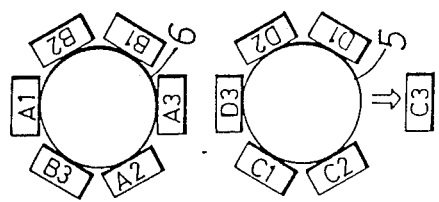
Figure 14I:
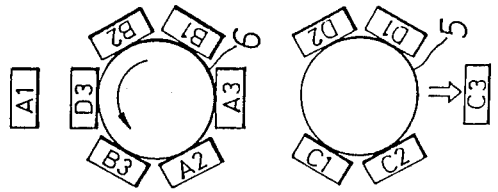
Figure 14H:
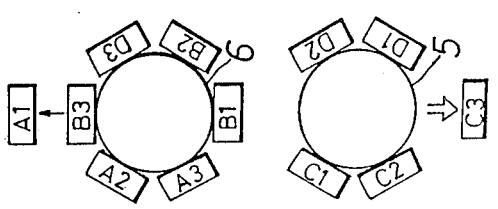
Figure 14G:
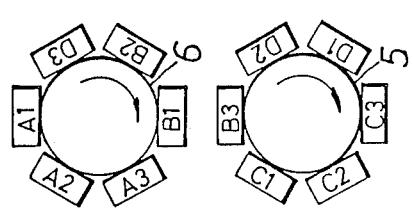
Figure 14F:
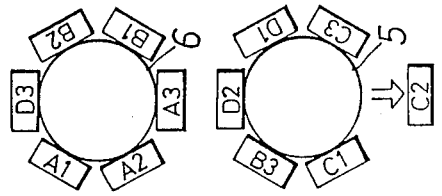

For example, during machining by the multi-spindle head C2, the multi-spindle D2 is lowered onto the first guide rails 5, as shown in FIG. 14(f). In this case, the multi-spindle D3 is located above the multi-spindle head D2 on the second guide rails 6.

Thereupon, when the index mechanism 25 is operated to bring the multi-spindle head C3 into the machining position MP after completion of machining by the multi-spindle head C2, the second index mechanism 26 is also operated to angularly displace through 60°, as shown in FIG. 14(g).

If the multi-spindle head C3 is to be advanced to the machining position MP to machine the work WC, then the elevator mechanism 60 is operated for lifting movement to raise the multi-spindle head B3 to the second guide rais 6, while at the same time retreating the multi-spindle head A1 upwardly from the second guide rails 6, as shown in FIG. 14(h).

Thereafter, the second index mechanism 26 is operated to turn by 60° as shown in FIG. 14(i) in a direction opposite to that described with reference to and shown in FIG. 14(g), thereby placing the multi-spindle head D3 onto the lift rails 10.

In such condition, the lowering of the elevator mechanism 60 enables the multi-spindle head D3 to be lowered onto the first guide rails 5, as shown in FIG. 14(j).

In this manner, each of the multi-spindle heads A1 to A3, B1 to B3, C1 to C3 and D1 to D3 can be brought into the machining position MP as desired to effect machining. Moreover, since the multi-spindle heads can be preparatorily placed to provide for the subsequent machining, the machining efficiency can be improved. Additionally, since the same number of multi-spindle heads can be stored on the first and second guide rails 5, 6, the number of the multi-spindle heads which can be stored is more than that in the prior art.

Since the guide pillars 61 are substantially integral with the base 1 through the connecting members 66 and 69 in the elevator mechanism 60, it is possible to support the guide pillars 61 vertically in a stabilized manner. In addition, during rising and lowering of the elevator mechanism 60, the rail support 13 which connects both the lift rails 10 and the rail support 21 which connects both the lift rails 18 are guided on the guide bars 84 and 85, and the locking blocks 36 of the multi-spindle heads A1 to A3, B1 to B3, C1 to C3 and D1 to D3 are guided on the head guide members 86 and 87. Therefore, the multi-spindle heads A1 to A3, B1 to B3, C1 to C3 and D1 to D3 are raised and lowered in a stabilized manner. Further, the pair of upper and lower elevators 62 are interconnected through the connecting member 74, and the pair of chains 77 connected to the upper elevator 62 are wound around the sprocket wheels 76 rotatably supported on the upper ends of the guide pillars 61, with the balance weights being connected to the chains 77. Therefore, the elevator 62 can be operated for rising and lowering movements in a stabilized manner with its horizontal attitude maintained and moreover, can be driven by the single lift-drive means 63.

In the first and second index mechanisms 25 and 26, the substantially U-shaped engage member 38 is disposed at the leading end of each of the index arms 28 and 31 and resiliently biased to project from the leading end, with the guide protrusions 44 and 45 being provided at the central upper and lower portion of the engage member 38, and the leading end of the locking block 36 is formed to conform to the contour of the guide protrusions 44 and 45. Therefore, in response to the rising and lowering movements of each of the multi-spindle heads A1 to A3, B1 to B3, C1 to C3 and D1 to D3, the engagement and disengagement between the locking block 36 and the index arm 28, 31 are easily achieved and moreover, the engaged state can be firmly maintained.

What is claimed is:

1. A multi-spindle head-replacing type machine tool comprising a machining unit disposed on a base for advancing and retreating movements between an original position and a machining position, a first annular guide rail including a movable rail integral with said machining unit and a stationary rail to surround said machining unit which is in said original position, a second annular guide rail disposed concentrically with and at a place axially offset from said first guide rail, a plurality of multi-spindle heads travellably carried on each of said first and second guide rails, first and second index mechanisms releasably connected respectively to the multi-spindle heads on said first and second guide rails for driving said multi-spindle heads for angular displacement, and an elevator mechanism disposed sideways from said first and second guide rails at a place offset from said movable rail for providing replacement of the multi-spindle heads between said first and second guide rails, wherein a part of said stationary rail of said first guide rail and a part of said second guide rail are divided as lift rails in a circular arc at a place corresponding to said elevator mechanism, respectively, and said elevator mechanism comprises an elevator connected to each of the lift rails of said first and second guide rails, and lift-drive means connected to the elevator which is to be raised and lowered between said first and second guide rails.

2. A multi-spindle head-replacing type machine tool according to claim 1, further comprising a signal generator attached to each of the multi-spindle heads for delivering a signal depending upon the type of the multi-spindle head, at least one detector disposed in a stationary location corresponding to each of the first and second guide rails for receiving a signal from said signal generator, said detector being connected to a sequence control for controlling operations of said first and second index mechanisms and said elevator mechanism to store individual locations of the multi-spindle heads on said first and second guide rails in said sequence control, and a work detector for detecting the type of a work which is to be newly machined, said work detector being connected to a control panel which delivers a preparatory movement signal into the sequence control to move the multi-spindle head for the new work to a predetermined position of the first guide rail.

3. A multi-spindle head-replacing type machine tool according to claim 1 or 2, wherein a pair of each of said first and second guide rails are arranged at a distance vertically spaced apart from each other, the distance between the pair of said first guide rails being the same as that between the pair of the second guide rails, and each pair of upper and lower lift rails are integrally interconnected through a rail support.

4. A multi-spindle head-replacing type machine tool according to claim 1 or 2, wherein a guide member for guiding the rising and lowering of each of the lift rails is fixedly disposed to extend vertically.

5. A multi-spindle head-replacing type machine tool according to claim 1 or 2, wherein a locking block is fixedly mounted on each of the multi-spindle heads to project toward the inside of each the first and second guide rails and a head guide member is disposed at a place corresponding to each of said lift rails to extend vertically and is adapted to engage the locking block at the time of rising and lowering of the lift rail for guiding such rising and lowering of the latter.

* * * * *